Figure 1:
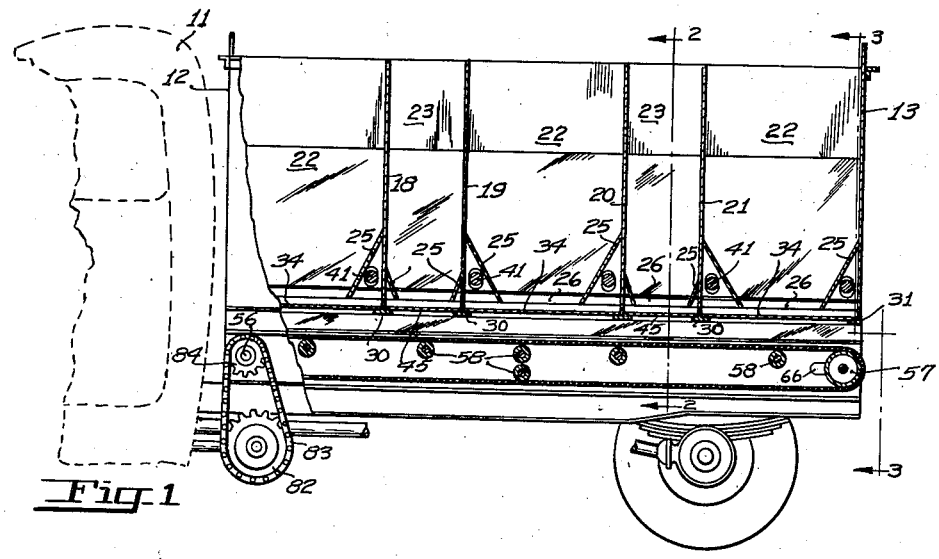

Nov. 3, 1942.　　　H. A. WAGNER ET AL　　　2,300,753
SELF UNLOADING TRUCK
Filed Aug. 6, 1941

HAROLD A. WAGNER
GUSTAVE H. WAGNER
INVENTORS

BY
ATTORNEY

Patented Nov. 3, 1942

2,300,753

UNITED STATES PATENT OFFICE 2,300,753

SELF-UNLOADING TRUCK

Harold A. Wagner and Gustave H. Wagner, Portland, Oreg.

Application August 6, 1941, Serial No. 405,656

8 Claims. (Cl. 214—83)

The present invention relates to improvements in truck bodies, particularly of the type adapted for hauling bulk material in a plurality of separated lots.

For certain types of hauling it is desirable to provide a truck body divided into a plurality of compartments from which predetermined measured quantities of bulk material may be conveniently unloaded. Unloading means may be provided and arranged in such a manner that the compartments may be selectively unloaded in case different materials are contained in the various compartments and which are to be unloaded in a desired sequence.

Such a truck body is particularly suitable for hauling unmixed ingredients for concrete, such as sand, gravel or aggregate, and bulk cement, it being undesirable to mix the cement with the sand or the like in advance of the final mixing operation. The sand or the like and the bulk cement may conveniently be loaded into separate compartments of the truck body and delivered in the unmixed form to the desired location at which they may be unloaded in separate lots, or together in case water is shortly to be added, and the concrete mixed for immediate pouring.

When hauling ingredients for a concrete mixer having a charging capacity less than a full truck load, a multicompartment truck is particularly suitable since a predetermined measured quantity of sand or the like and cement may be loaded into various compartments at the central loading plant, the measured quantities corresponding with the normal charge for the mixer. Upon arriving at the mixer the proper measured quantities of both sand and cement for each charge can readily be dumped into the mixer skip without requiring rehandling and remeasuring thereof.

It is an object of the present invention, therefore, to provide a new and improved truck body which is particularly suitable for transporting bulk material in separate lots and which may selectively be unloaded from the truck body as desired.

A further object of the invention is to provide a new and improved truck body having a plurality of compartments therein which may be variously loaded as desired, the truck body including a power driven unloading means whereby the various compartments may be selectively unloaded.

A more specific object of the invention is to provide a new and improved control gate arrangement for a multicompartment truck body having a conveyor unloading means extending beneath the compartments.

Another object of the invention is to provide a new and improved multicompartment truck body structure and power driven unloading means therefor which is simple in design and of low manufacturing cost.

In accordance with the illustrated embodiment of the invention, a truck body is provided having a plurality of transverse partitions dividing the truck body into a plurality of compartments. Transversely slidable gates are provided at the bottom of each compartment and which are connected for independent operation to lever means pivotally mounted on one side of the body. The truck body is mounted upon a subframe structure including an unloading means comprising a conveyor belt adapted to be driven through a suitable power take-off from the truck engine. The conveyor belt extends longitudinally of the truck body beneath the compartments and upon opening of the compartment gates the material is conveyed thereby to the rear end of the truck body and discharged therefrom. The truck body may be removably mounted upon the conveyor unit, the conveyor unit in turn being adapted for removable attachment to the longitudinal frame members of a truck chassis.

Further objects and advantages of the invention will appear from the following description, taken in connection with the accompanying drawing, while the features of novelty will be pointed out with greater particularity in the appended claims.

Figures 2, 3:
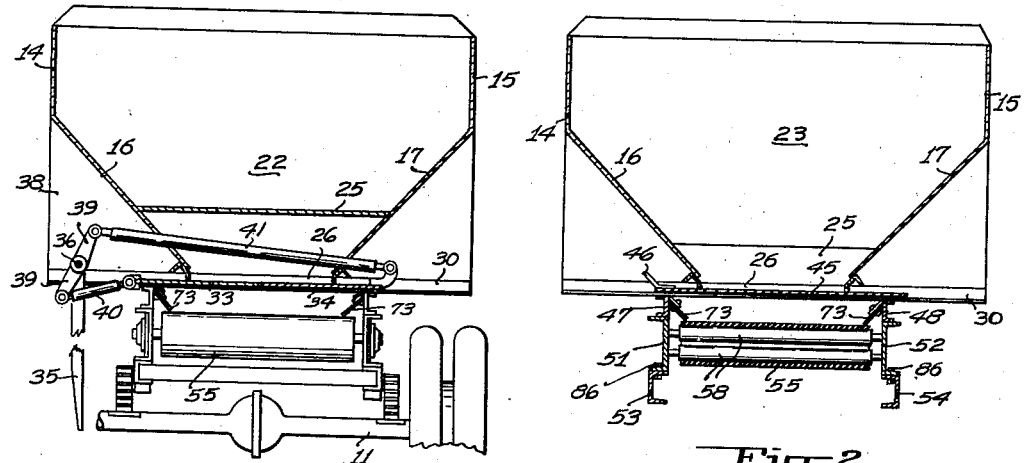
Figure 4:
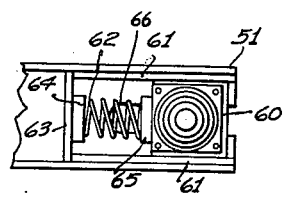
Figure 5:
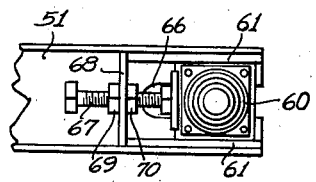

In the drawing, Figure 1 is a longitudinal cross sectional view, taken through a truck body constructed in accordance with one form of the invention; Figure 2 is a transverse cross sectional view taken along the line 2—2 of Figure 1; Figure 3 is a cross sectional view taken along the line 3—3 of Figure 1; Figure 4 is a fragmentary detail view illustrating one form of a conveyor belt tightener; and Figure 5 is a fragmentary view illustrating a second modification of a conveyor belt tightener embodied in the invention.

Referring to the drawing, the truck body of the invention is adapted to be mounted upon the chassis of a conventional truck 11. The truck body proper may be made of sheet metal and is of a generally elongate rectangular configuration comprising opposite end walls 12 and 13 and opposite side walls 14 and 15. The lower portions of the side walls 14 and 15 slope inwardly toward each other, as indicated at 16 and 17, respectively, to facilitate the flow of material toward the central discharge outlets in the bottom. The truck body, in this instance, is divided into a plurality of compartments by means of transversely extending partitions 18, 19, 20 and 21, it being understood that the specific number of partitions and compartments formed thereby may be varied as desired in accordance with the specific application to be made of the truck. In the specific embodiment shown, the partitions are so spaced as to define relatively large compartments 22 for holding sand, gravel or the like, and relatively small compartments 23 for holding bulk cement. At the bottom of each compartment transversely extending plates 25 are provided which slope toward each other, and which, together with the sloping side plates 16 and 17 of the truck body, define discharge openings 26 at the lower ends of each of the respective compartments.

T irons 30 are provided at the lower extremity of each of the partitioning plates 18 to 21, inclusive, and are securely welded thereto, while angle irons 31 are welded to the lower ends of the opposite end walls 12 and 13. The flange portions of the angle irons 31 and the T irons 30 provide upwardly facing shoulders or sliding surfaces for gates which are provided at the bottom of each of the respective compartments. The gates are slidably mounted upon the upper surfaces of these flanges for movement horizontally thereupon transversely of the truck body. The gates provided at the bottom of the larger compartments 22 comprise two separable portions 33 and 34, as shown more clearly in Figure 3, and which are adapted to be moved in opposite directions by lever means connected thereto. The lever operating means comprises a band lever 35 connected to a shaft 36 which is journaled at its opposite ends in the gusset plates 38. Secured to the shaft 36 are a pair of arms 39, the lower ends of which may be pivotally connected by links 40 to the adjacent end of the gate portion 33, while the upper ends of the arms 39 may be connected through links 41 to the opposite end of the gate portion 34. The links 41 extend transversely of the truck body through the spaces provided beneath the sloping plates 25 in the lower ends of the compartments. Openings are provided in the sloping side walls 16 and 17 of the truck body for cooperatively receiving the links 41 therethrough. It will be obvious that upon movement of the hand lever 35 in the clockwise direction, as viewed in Figure 3, relative separation of the gate portions 33 and 34 may be effected, while reverse movement of the lever 35 will effect a closure of the gate portions. Such a leverage arrangement is particularly suitable for opening the sliding gates at the lower ends of the larger compartments, since the weight of the material bearing against the gates increases considerably the frictional resistance to sliding movement thereof. For the gates at the lower ends of the smaller compartments 23 such leverage operating arrangement may not be necessary, though a similar operating means may be provided therefor if desired.

Referring more particularly to Figure 2, the gate in this instance comprises a single piece plate 45 which is slidably mounted upon the upper surface of the supporting flanges. The plate 45 is provided with a handle 46 at one end thereof, by means of which the plate 45 may be slid transversely of the truck body for permitting the discharge of the compartment contents.

By reason of the inwardly sloping plate 25 provided at the bottom of each compartment the area of the bearing surface upon each gate for the load contained in each compartment, and hence the weight imposed by the load upon each gate, is materially reduced. The gates may therefore be shifted with greater ease than if the total weight of the compartment contents were borne thereupon. Furthermore, these plates deflect the material flowing from the compartments away from the gate slides and which, accordingly, are kept free of accumulations which might otherwise interfere with the closing of the gates.

The truck body is provided with a pair of laterally spaced channel beam members 47 and 48 extending longitudinally of the body, the upper flanges of which are rigidly secured as by welding to the lower surface of the transverse angle irons 31 and the T irons 30. The longitudinal beams 47 and 48 may be supported upon the frame of a power driven unloading unit by means of which material discharged from the lower ends of the various compartments may be carried to the rear end of the truck and discharged therefrom. The unloader unit comprises a frame structure including a pair of laterally spaced channel beam members 51 and 52 which are of a length corresponding substantially to that of the truck body and are spaced apart a distance corresponding to the distance between the side frame members 53 and 54 of a truck chassis. Arranged between the side frame members 51 and 52 is a conveyor belt 55 which extends over a driving roller indicated by shaft 56 at the forward end of the frame and an idler roller 57 at the rear end of the frame. The belt 55 is suitably supported intermediate its opposite ends upon additional idler rollers 58 to prevent undue sagging thereof upon application of load thereto from the compartments. The various rollers 56, 57 and 58 are suitably journaled at their opposite ends upon the side beams 51 and 52.

The belt 55 is preferably of a relatively pliable material such as of the rubber impregnated endless cord type so as to have a minimum of elasticity in the longitudinal direction. Such a belt, however, is none the less subject to a certain degree of stretching, and, in order that it may be kept taut upon the rollers, the idler 57 is adjustably mounted in the rear end of the supporting frame. The supporting arrangement illustrated in Figure 4 includes a bearing block 60 for each of the opposite ends of the roller 57, each block being slidably supported within suitable tracks 61 provided on the facing flanges of the channel beams 51 and 52. The bearing blocks 60 are urged rearwardly of the beam members 51 and 52 by means of springs 62 arranged between stops 63 rigidly secured to the beams and the bearing blocks, suitable seats 64 and 65 being provided for the opposite ends of the springs. The ends of the beams 51 and 52 are slotted as indicated at 66 to provide for relative movement of the shaft through the web of the beams.

In the modification illustrated in Figure 5 the spring 62 is substituted by a manually adjustable screw 67 which is threaded through the stop plate 68 extending between the channel flanges. The screw 67 is adapted to be adjusted into engagement with the adjacent end of the slidable bearing block 60 of the roller 57, while the position of adjustment of the screw 67 may be secured by means of lock nuts 69 and 70 provided on the screw 67 on opposite sides of the plate 68.

It will be observed that the bottom of the truck body is spaced by the beam members 47 and 48 from the upper surface of belt 55. In order that the material flowing from the respective compartments will be retained upon the upper surface of the belt 55 and prevented from spilling over the opposite edges thereof, suitable guards 72 and 73 are provided extending longitudinally of the belt. The guards 72 and 73 preferably comprise strips of relatively resilient material such as rubberized fabric and are secured along their upper edge to the side beam members 47 and 48 from which they extend angularly downwardly toward each other and adjacent the upper surface of the belt 55.

The belt 55 may be driven through a suitable power take-off from the prime mover engine of the truck. The power take-off in this instance may be provided with a sprocket 82 which may be connected by chain 83 to a sprocket 84 provided on the end of the shaft 56 of the forward belt roller.

The side beam members 47 and 48 of the truck body, and beam members 51 and 52 of the unloader unit, are preferably spaced the same distance apart as the side frame members 53 and 54 of the truck chassis to facilitate mounting. The truck body may be removably attached to the unloader unit, while the latter may in turn be removably secured to the upper surface of the truck frame as by bolts 86.

Having described the invention in what are considered to be preferred embodiments thereof, it is desired that it be understood that the specific details shown are merely illustrative, and that the invention may be carried out by other means.

What we claim is:

1. In a device of the class described, in combination a body being formed of a pair of side plates, a pair of end plates fastened to the side plates, a plurality of partition plates fastened to the side plates at spaced intervals, angular plates attached to the partition plates and side plates, said side plates being angled inwardly on their lower ends to form an inclined discharge outlet, cross member T irons positioned beneath the end plates and partition plates, parting gates slidable upon the T iron lips, levers positioned to manually manipulate the gates, a cross member spacer channel mounted beneath the T irons, and a rotatable endless belt positioned within a subframe and mounted beneath the spacer channel, said subframe being demountably attached to a suitable conveying vehicle and said body being demountably attached to the subframe.

2. The combination comprising a longitudinal truck body, a plurality of partitions dividing said body into a plurality of compartments, a conveyor means on said body and extending longitudinally thereof beneath said compartments, a gate arranged for transverse sliding movement at the bottom of each of said compartments, said partitions including means defining slides for said gates, said partitions also including baffle plates depending downwardly and outwardly therefrom for deflecting material flowing from said compartments away from said slides, and lever means pivotally mounted on said body and operatively connected to said gates for selectively emptying said compartments onto said conveyor means.

3. The combination comprising a longitudinal truck body, a plurality of partitions dividing said body into a plurality of compartments, a conveyor means mounted on said body and extending longitudinally thereof beneath said compartments, said conveyor means being adapted for receiving material from any of said compartments and conveying said material to the rear end of said body, gates comprising a pair of separable portions slidably mounted at the bottom of said compartments, lever means connected to said gate portions for operating said gate portions in opposite directions whereby said compartments may be selectively emptied onto said conveyor means.

4. The combination comprising a truck body, partitions dividing said body into a plurality of compartments, a conveyor belt on said body arranged beneath said compartments and extending longitudinally of said body, a separable gate comprising two oppositely movable portions slidably arranged at the bottom of corresponding of said compartments, and pivoted lever means mounted on said body and connected to the portions of said separable gate for moving said gate portions in opposite directions.

5. The combination comprising a longitudinal truck body, partitions dividing said body into a plurality of compartments, inwardly sloping plates extending transversely of said body at the lower portion of each of said compartments defining discharge outlets therefor, a gate slidably arranged at the bottom of each of said compartments, lever means mounted on the side of said body including linkages extending transversely thereof through spaces defined by said sloping plates, said lever means being pivotally connected to said gates for selectively emptying said compartments, and conveyor means mounted on said body extending longitudinally thereof in a spaced relation below said gates for conveying material from said compartments to the rear end of said body.

6. A truck comprising a longitudinal body, a plurality of partitions dividing said body into a plurality of compartments, inwardly sloping plates at the lower end of each of said compartments defining discharge outlets therefor, a separable gate comprising a pair of horizontally slidable portions arranged at the bottom of each of said discharge outlets, lever means pivotally mounted on one side of said body including operating linkages extending transversely thereof through spaces defined by said sloping plates, said lever means being connected to opposite ends of said gate portions whereby said gate portions may be moved simultaneously in opposite directions for controlling the flow of material from said compartments.

7. The combination comprising a longitudinal truck body, a plurality of partitions dividing said body into a plurality of compartments, a conveyor belt mounted on said body and extending longitudinally thereof beneath said compartments, a discharge outlet at the bottom of each of said compartments, a slidable gate for controlling flow of material from each of said outlets, lever means for independently operating each of said gates for selectively emptying said compartments onto said belt, the upper surface of said belt being spaced a considerable distance below said gates, and longitudinal means extending downwardly from the bottom of said body on the opposite sides of said discharge outlets for substantially the full length of said body to a point adjacent the upper surface of said belt for retaining material flowing from said compartments on the upper surface of said belt.

8. The combination comprising a truck body, a plurality of transverse partitions dividing said body into a plurality of compartments, T irons secured to the lower ends of said partitions, a gate at the bottom of each of said compartments, said gates being slidably supported upon the upper surface of the oppositely extending flanges of said T irons, and means extending downwardly and outwardly from said partitions for deflecting material flowing from said compartments from said flange surfaces, lever means pivotally mounted on the side of said body and connected to said gates for selectively emptying said compartments, and conveyor means mounted on said body extending longitudinally beneath said compartments for conveying material therefrom to the rear end of said body.

HAROLD A. WAGNER.
GUSTAVE H. WAGNER.